United States Patent
Dellock et al.

(10) Patent No.: US 10,442,361 B2
(45) Date of Patent: *Oct. 15, 2019

(54) EXTRUDED MULTI-LAYER MOLDED RUNNING BOARD

(71) Applicant: Ford Global Technologies, LLC, Dearborn, MI (US)

(72) Inventors: Paul Kenneth Dellock, Northville, MI (US); Stuart C. Salter, White Lake, MI (US); Michael Musleh, Canton, MI (US); Talat Karmo, Waterford, MI (US); David Brian Glickman, Southfield, MI (US); Harry Lobo, Canton, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,852

(22) Filed: Mar. 9, 2018

(65) Prior Publication Data

US 2018/0194289 A1    Jul. 12, 2018

Related U.S. Application Data

(60) Division of application No. 15/602,708, filed on May 23, 2017, now Pat. No. 9,950,671, which is a
(Continued)

(51) Int. Cl.
*B60R 3/00* (2006.01)
*B29C 49/04* (2006.01)
(Continued)

(52) U.S. Cl.
CPC .......... *B60R 3/002* (2013.01); *B29C 48/0017* (2019.02); *B29C 48/0022* (2019.02);
(Continued)

(58) Field of Classification Search
CPC .......... B60R 3/002; B60R 3/005; B60R 9/02; B29C 47/0004; B29C 47/0023;
(Continued)

(56) References Cited

U.S. PATENT DOCUMENTS 3,051,994 A * 9/1962 Carozzo ............... B29C 45/164
                                                            249/105
3,888,612 A * 6/1975 Schrewe ............. B29C 44/0492
                                                            425/130
(Continued)

FOREIGN PATENT DOCUMENTS

DE    202004020339    4/2005

*Primary Examiner* — Jeffrey M Wollschlager
(74) *Attorney, Agent, or Firm* — Vichit Chea; Price Heneveld LLP

(57) ABSTRACT

A vehicle running board includes opposing vertical walls extending along a length of a tubular structure and including a carbon-fiber component. Opposing horizontal walls extend between the opposing vertical walls and include a glass component. The opposing vertical and opposing horizontal walls form the tubular structure having a generally rectilinear cross section. A polymer outer covering extends over the opposing vertical and opposing horizontal walls.

7 Claims, 8 Drawing Sheets

Related U.S. Application Data continuation of application No. 15/206,575, filed on Jul. 11, 2016, now Pat. No. 9,707,898.

(51) Int. Cl.

| | | |
|---|---|---|
| *B29C 48/09* | (2019.01) | |
| *B29C 48/00* | (2019.01) | |
| *B29C 48/21* | (2019.01) | |
| *B29C 48/88* | (2019.01) | |
| *B29K 23/00* | (2006.01) | |
| *B29K 105/14* | (2006.01) | |
| *B29K 307/04* | (2006.01) | |
| *B29K 309/08* | (2006.01) | |
| *B29L 31/30* | (2006.01) | |
| *B60R 9/02* | (2006.01) | |
| *B29C 49/06* | (2006.01) | |
| *B29C 45/16* | (2006.01) | |
| *B29C 45/00* | (2006.01) | |
| *B29C 45/18* | (2006.01) | |

(52) U.S. Cl.
CPC ............ *B29C 48/022* (2019.02); *B29C 48/09* (2019.02); *B29C 48/21* (2019.02); *B29C 48/919* (2019.02); *B29C 48/9115* (2019.02); *B29C 49/041* (2013.01); *B29C 45/0005* (2013.01); *B29C 45/164* (2013.01); *B29C 45/1642* (2013.01); *B29C 45/1646* (2013.01); *B29C 45/1684* (2013.01); *B29C 45/1866* (2013.01); *B29C 49/04* (2013.01); *B29C 49/06* (2013.01); *B29C 2045/1692* (2013.01); *B29C 2793/009* (2013.01); *B29K 2023/12* (2013.01); *B29K 2105/145* (2013.01); *B29K 2307/04* (2013.01); *B29K 2309/08* (2013.01); *B29L 2031/3005* (2013.01); *B60R 3/005* (2013.01); *B60R 9/02* (2013.01)

(58) Field of Classification Search
CPC ............ B29C 47/0054; B29C 47/0066; B29C 47/065; B29C 48/9115; B29C 48/0022; B29C 48/022; B29C 48/21; B29C 48/0017; B29C 48/09; B29C 48/919; B29C 49/041; B29C 2793/009; B29C 49/04; B29C 49/06; B29C 45/0005; B29C 45/164; B29C 45/1642; B29C 45/1646; B29C 45/1684; B29C 2045/1692; B29C 45/1866; B29K 2023/12; B29K 2023/145; B29K 2307/04; B29K 2309/08; B29K 2105/145; B29L 2031/3005

See application file for complete search history.

(56) References Cited

U.S. PATENT DOCUMENTS

| | | | | |
|---|---|---|---|---|
| 3,950,483 A * | 4/1976 | Spier | ............... | B29C 45/164 264/241 |
| 4,056,344 A | 11/1977 | Lemelson | ............... | B29C 57/08 425/132 |
| 4,149,839 A * | 4/1979 | Iwawaki | ............... | B29C 47/0023 425/133.1 |
| 4,210,616 A * | 7/1980 | Eckardt | ............... | B29C 44/0492 264/255 |
| 4,659,531 A * | 4/1987 | Ezaki | ............... | B29C 47/0023 264/512 |
| 4,945,682 A * | 8/1990 | Altman | ............... | B60J 5/0405 296/146.5 |
| 4,951,986 A * | 8/1990 | Hanafusa | ............... | B29C 49/4802 264/523 |
| 5,156,796 A * | 10/1992 | Nakagawa | ............... | B29C 47/0023 264/167 |
| 5,571,581 A * | 11/1996 | Koizumi | ............... | B29C 45/1642 293/128 |
| 5,667,737 A * | 9/1997 | Wittmann | ............... | A43B 1/0027 264/245 |
| 5,667,748 A * | 9/1997 | Ohta | ............... | B29C 47/0023 264/171.27 |
| 5,713,589 A * | 2/1998 | Delgado | ............... | B60R 3/00 182/190 |
| 6,090,338 A * | 7/2000 | Wrobbel | ............... | B29C 47/0023 264/173.16 |
| 6,254,949 B1 * | 7/2001 | Gluck | ............... | C08L 77/00 138/118 |
| 6,423,388 B1 * | 7/2002 | Bateson | ............... | B29C 70/222 297/452.2 |
| 6,513,821 B1 * | 2/2003 | Heil | ............... | B60R 3/002 182/228.2 |
| 6,663,822 B1 * | 12/2003 | Cargill | ............... | B29C 47/0023 264/515 |
| 6,692,064 B1 * | 2/2004 | Porter | ............... | B60R 19/18 264/510 |
| 6,843,954 B2 * | 1/2005 | Porter | ............... | B29C 45/0046 264/513 |
| 6,997,469 B2 | 2/2006 | Lanoue et al. | | |
| 7,000,932 B2 * | 2/2006 | Heil | ............... | B60R 3/002 280/163 |
| 7,168,721 B2 * | 1/2007 | Mulder | ............... | B60R 3/00 280/163 |
| 7,322,593 B2 | 1/2008 | Smith et al. | | |
| 7,332,120 B2 * | 2/2008 | Chapman | ............... | B29C 49/20 264/511 |
| 8,557,151 B2 * | 10/2013 | Lipson | ............... | B29C 47/0023 215/382 |
| 9,174,537 B1 * | 11/2015 | Webb | ............... | B60K 37/00 |
| 9,186,993 B1 * | 11/2015 | Webb | ............... | B60K 37/00 |
| 9,193,394 B1 * | 11/2015 | Bharathan | ............... | B29C 45/0005 |
| 9,688,005 B2 * | 6/2017 | Bharathan | ............... | B60K 37/00 |
| 9,849,636 B2 * | 12/2017 | Gross | ............... | B29C 70/46 |
| 9,944,230 B2 * | 4/2018 | Campbell | ............... | B60R 3/002 |
| 2003/0006576 A1 * | 1/2003 | Lanoue | ............... | B60R 3/002 280/163 |
| 2003/0211307 A1 * | 11/2003 | Porter | ............... | B29C 45/1642 428/313.3 |
| 2003/0211311 A1 * | 11/2003 | Porter | ............... | B29C 45/1642 428/318.8 |
| 2005/0067741 A1 * | 3/2005 | Chapman | ............... | B29C 49/20 264/516 |
| 2005/0093266 A1 * | 5/2005 | Smith | ............... | B60R 3/002 280/163 |
| 2005/0263974 A1 * | 12/2005 | Mulder | ............... | B60R 3/00 280/163 |
| 2006/0051569 A1 * | 3/2006 | Porter | ............... | B29C 45/1642 428/318.8 |
| 2006/0177668 A1 * | 8/2006 | Asai | ............... | B29C 45/164 428/411.1 |
| 2006/0249924 A1 | 11/2006 | Armstrong et al. | | |
| 2007/0045893 A1 | 3/2007 | Asthana et al. | | |
| 2007/0296175 A1 * | 12/2007 | Flajnik | ............... | B60R 3/002 280/169 |
| 2010/0112267 A1 * | 5/2010 | Stenzel | ............... | B29C 45/16 428/60 |
| 2010/0136269 A1 | 6/2010 | Andersen et al. | | |
| 2011/0171032 A1 | 7/2011 | Hancock et al. | | |
| 2011/0189025 A1 | 8/2011 | Hancock et al. | | |
| 2011/0277926 A1 | 11/2011 | Polk, Jr. | | |
| 2012/0052247 A1 | 3/2012 | Pook et al. | | |
| 2012/0280536 A1 * | 11/2012 | Malek | ............... | B29C 45/164 296/193.09 |
| 2013/0189112 A1 | 7/2013 | Hedges et al. | | |
| 2013/0214450 A1 * | 8/2013 | Kiple | ............... | B29C 45/164 264/250 |
| 2013/0309465 A1 | 11/2013 | Oda et al. | | |
| 2013/0323454 A1 * | 12/2013 | Chapman | ............... | B60R 3/002 428/74 |

(56) References Cited

U.S. PATENT DOCUMENTS

| | | |
|---|---|---|
| 2014/0178652 A1* | 6/2014 | Gross .................. B29C 70/46 |
| | | 428/189 |
| 2014/0191492 A1 | 7/2014 | Al-Sheyyab et al. |
| 2015/0044402 A1 | 2/2015 | Carson, Jr. et al. |
| 2015/0044419 A1 | 2/2015 | Carson, Jr. et al. |
| 2015/0321398 A1* | 11/2015 | Bharathan .............. B60K 37/00 |
| | | 264/254 |
| 2015/0321400 A1 | 11/2015 | Preisler et al. |
| 2015/0343715 A1 | 12/2015 | Cruzado Parla et al. |
| 2015/0376946 A1 | 12/2015 | Kurzer et al. |
| 2016/0016614 A1 | 1/2016 | Conze |
| 2016/0082650 A1 | 3/2016 | Carson, Jr. |
| 2016/0264284 A1 | 9/2016 | Masuda |
| 2017/0341318 A1 | 11/2017 | Von Koenigsegg |
| 2018/0009384 A1 | 1/2018 | Dellock et al. |

\* cited by examiner

EXTRUDED MULTI-LAYER MOLDED RUNNING BOARD

CROSS-REFERENCE TO RELATED APPLICATION

The present application is a divisional of U.S. patent application Ser. No. 15/602,708 filed May 23, 2017, entitled EXTRUDED MULTI-LAYER MOLDED RUNNING BOARD, which is a continuation of U.S. patent application Ser. No. 15/206,575 filed Jul. 11, 2016, entitled EXTRUDED MULTI-LAYER MOLDED RUNNING BOARD, now U.S. Pat. No. 9,707,898, the entire disclosures of which are hereby incorporated herein by reference.

FIELD OF THE INVENTION

The present invention generally relates to running boards for vehicles, and more specifically, a multi-layer extruded running board.

BACKGROUND OF THE INVENTION

Many vehicles, in particular, larger SUVs and trucks, include running boards that have a step surface that allows an occupant of the vehicle to step on the running board to assist with entering or exiting the vehicle. Such running boards are made of components that are sturdy enough to support the weight of at least one individual.

SUMMARY OF THE INVENTION

According to one aspect of the present invention, a vehicle running board includes opposing vertical walls extending along a length of a tubular structure and including a carbon-fiber component. Opposing horizontal walls extend between the opposing vertical walls and include a glass component. The opposing vertical and opposing horizontal walls form the tubular structure having a generally rectilinear cross section. A polymer outer covering extends over the opposing vertical and opposing horizontal walls.

According to another aspect of the present invention, a method for forming a vehicle running board includes bi-extruding a vertically-oriented carbon-fiber reinforcing material with a laterally-oriented glass reinforcing material to form a tubular parison, co-extruding a polymer outer covering with the tubular parison and molding the tubular parison and the polymer outer covering to form a tubular running board structure.

According to another aspect of the present invention, a vehicle running board includes opposing vertical walls extending along a length of a tubular structure. The opposing vertical walls include a carbon-fiber component that is free of a glass component. Opposing horizontal walls extend between the opposing vertical walls and include the glass component and are free of the carbon-fiber component. A polymer outer covering extends over the opposing vertical and opposing horizontal walls.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
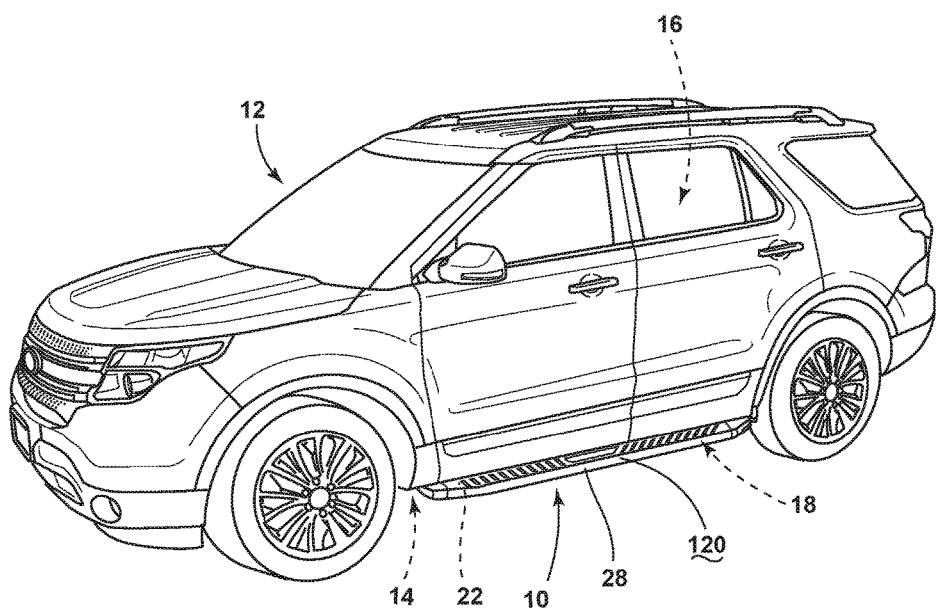
FIG. 1 is a side perspective view of a vehicle incorporating an aspect of the tri-extruded multi-layer running board.
Figure 2:
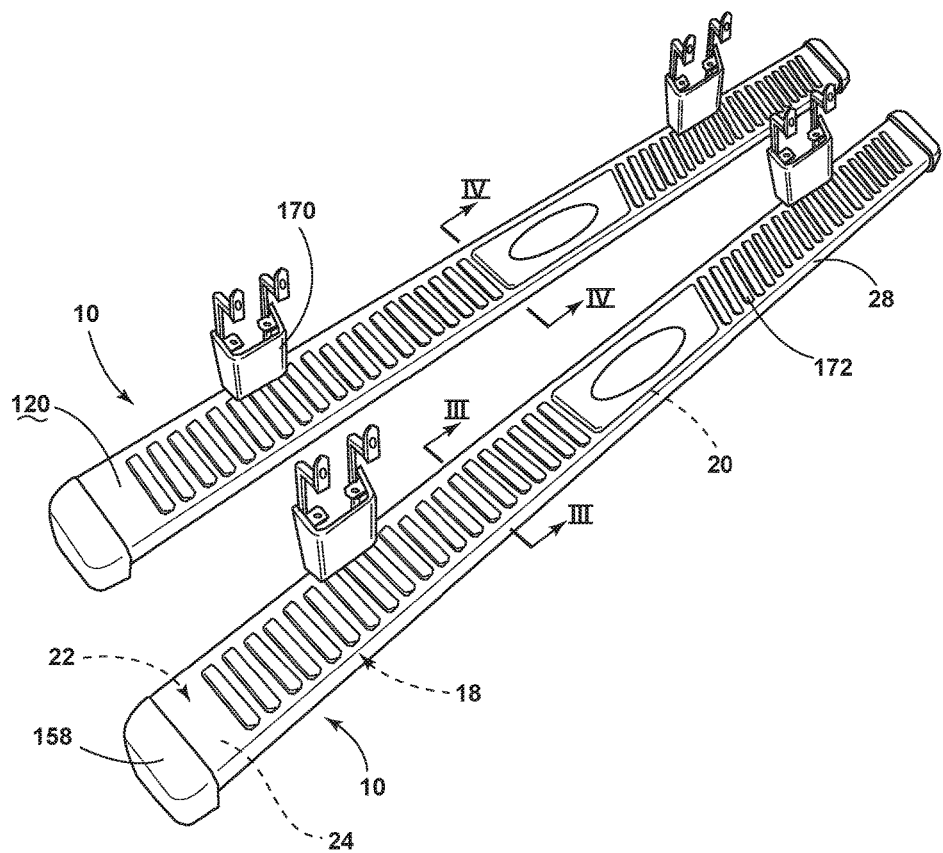
FIG. 2 is a top perspective view of two aspects of the tri-extruded multi-layer running board.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a running board for a vehicle 12 that is attached to a frame 14 of a vehicle 12 for providing an occupant egress assistance for entering and exiting the passenger compartment 16 of the vehicle 12. The running board 10 for the vehicle 12 includes opposing vertical walls 18 that extend along a length of a tubular structure 26, where the opposing vertical walls 18 include a carbon-fiber component 20. Opposing horizontal walls 22 are adapted to extend between the opposing vertical walls 18. The opposing horizontal walls 22 include a glass component 24. It is contemplated that the opposing vertical and opposing horizontal walls 22 that form the tubular structure 26 include a generally rectilinear cross section. A polymer outer covering 28 extends over the opposing vertical and opposing horizontal walls 22 to form a decorative outer covering 28 for the running board 10.

Referring again to FIGS. 1-4, the running board 10 can include at least one interior vertical wall 40 that extends along the length of the tubular structure 26. According to various embodiments, the at least one interior vertical wall 40 can be an additional vertical wall that includes the carbon-fiber component 20 and is made of substantially the same material or the same material as the opposing vertical walls 18. It is also contemplated that the at least one interior vertical wall 40 can be a formed portion of a lower horizontal wall 42 of the opposing horizontal walls 22. In such an embodiment, the lower horizontal wall 42 can include a contoured reinforcing structure 44 defined therein and that at least partially forms the interior vertical walls 40 of the tubular structure 26. It is further contemplated that the contoured reinforcing structure 44 can be defined as a rectilinear channel 46 that extends along the length of the tubular structure 26 to form one or more interior vertical walls 40 of the running board 10. Where a contoured reinforcing structure 44 is contemplated, the contoured reinforcing structure 44 can define any one of several cross-sectional shapes that can include, but are not limited to, rectilinear, arcuate, polygonal, irregular, combinations thereof, and other similar shapes.

Referring again to FIGS. 1-4, it is contemplated that each of the opposing vertical walls 18 and the at least one interior vertical wall 40 can be made of a carbon-fiber filled polypropylene. Additionally, each of the opposing horizontal walls 22 can be made of glass-filled polypropylene. It is contemplated that other materials can be used in conjunction with the carbon-fiber component 20 of the opposing vertical walls 18 and the glass component 24 of the opposing horizontal walls 22 where such materials can include, but are not limited to, various polymers, composite materials, metals, other carbon fiber materials, other glass-based materials, combinations thereof, and other similar formable materials.

According to the various embodiments, the inclusion of the carbon-fiber component 20 in the opposing vertical walls 18 and the glass component 24 disposed within the opposing horizontal walls 22 allows for the inclusion of stronger materials to be placed where necessary to provide the required structural integrity for the running board 10. Accordingly, the vertical components, such as the opposing vertical walls 18 and possibly the interior vertical walls 40, which make up approximately 20%-30% of the running board 10, are made of the stronger and lighter carbon-fiber component 20. The use of these stronger and lighter carbon-fiber components 20 allows these portions of the running board 10 to be made thinner while not losing any structural integrity with respect to the strength of the running board 10. Simultaneously, other components of the running board 10 including the opposing horizontal walls 22, and possibly, the interior vertical walls 40, incorporate the glass component 24 and other materials including, but not limited to, polypropylene and/other polymers and other materials as described above, where these materials provide less structural integrity than that of the carbon-fiber component 20. Additionally, the strategic use of the carbon-fiber component 20 decreases the weight of the running board 10 while not sacrificing the structural integrity, rigidity and overall strength of the running board 10. Accordingly, the use of these combinations of materials in specific locations of the running board 10 can provide an approximately 30%-60% weight savings. The decreased weight of the running board 10 provides for an overall decreased weight of the vehicle 12 and better fuel efficiency. The overall cost of the running board 10 can also be decreased by strategically placing the more costly carbon-fiber component 20 in specific locations of the running board 10 while positioning the lower cost materials including the glass component 24 and the remainder of the running board 10.

Figure 3:
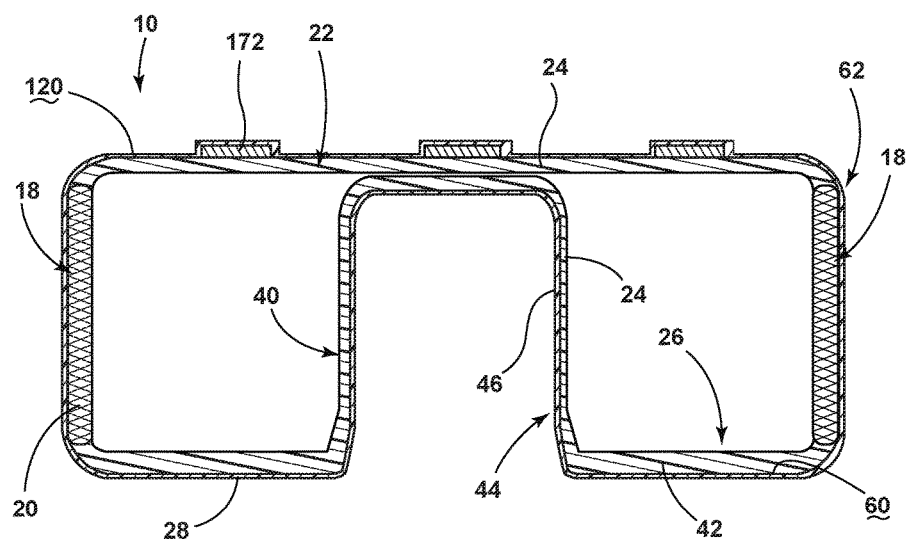
FIG. 3 is a cross-sectional view of an aspect of the multi-layer tri-extruded running board of FIG. 2 taken along line III-III.
Figure 4:
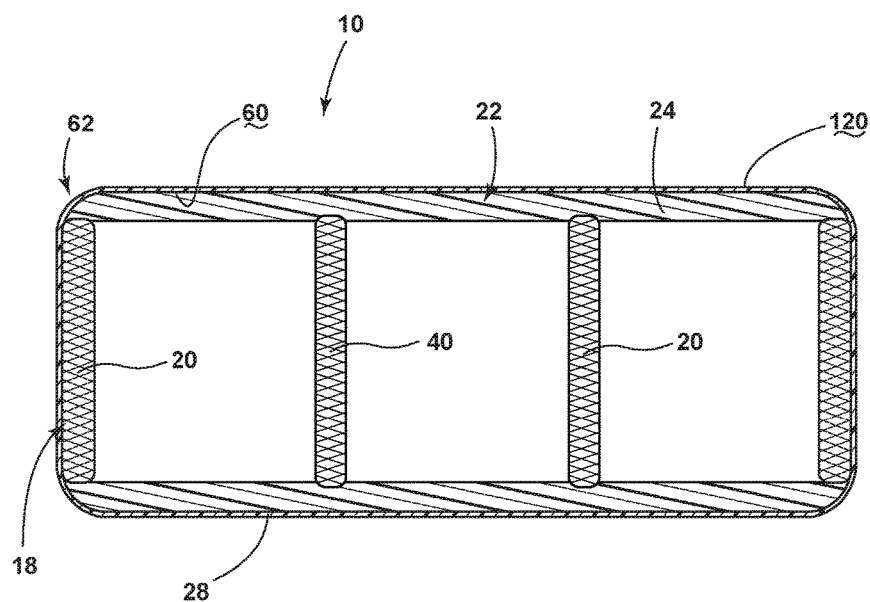
FIG. 4 is a cross-sectional view of an aspect of the tri-extruded multi-layer running board of FIG. 2 taken along line IV-IV.

Referring now to FIGS. 3 and 4, the configurations of the interior vertical walls 40 that form a contoured reinforcing structure 44 of the running board 10 can be configured based upon the type of vehicle 12 that the running board 10 is attached to and the overall purpose that the vehicle 12 is catered toward. Accordingly, a vehicle 12 that is typically used in rougher conditions and experiences greater weight and impact tolerances can include the running board 10 exemplified in FIG. 4 where the interior vertical walls 40 include the carbon-fiber component 20. Accordingly, the opposing vertical walls 18 and at least one interior vertical wall 40 can be made of the higher strength carbon-fiber component 20 to provide greater strength and rigidity to the overall tubular structure 26 of the running board 10. Alternatively, in vehicles 12 that experience lower weight and impact tolerances or for more casual driving conditions, such as small to mid-range SUVs, may include the interior vertical walls 40 that are made from the same material as the opposing horizontal walls 22 having the glass component 24. It is also contemplated that these two aspects of the running board 10 can be marketed as options for vehicles 12 depending upon the wants and needs of the user of the particular vehicle 12.

Referring now to FIGS. 3-6, it is contemplated that the opposing vertical walls 18 and opposing horizontal walls 22 can be bi-extruded using injection molding to form the tubular structure 26 and the polymer outer covering 28 can be co-extruded with the tubular structure 26 to be disposed over the exterior surface 60 of the tubular structure 26. In such an embodiment, it is contemplated that the carbon-fiber component 20, the glass component 24 and the polymer outer covering 28 can be formed into an extruded or injection molded parison 62. This parison 62 can take the form of a base tube 64 that can be placed into a blow mold 66, where the extruded parison 62 is then blow-molded into the final shape or a substantially final shape of the running board 10. In such an embodiment, the extruded parison 62 includes opposing carbon-fiber portions 68 of the base tube 64 that include the carbon-fiber component 20 and adjacent opposing glass portions 70 that include the glass component 24. These components of the extruded parison 62 are then placed within the blow mold 66 in an orientation that substantially matches the final configuration of the running board 10 where the carbon-fiber component 20 is ultimately disposed within the opposing vertical walls 18 of the running board 10 and the glass component 24 is ultimately disposed within the opposing horizontal walls 22 of the running board 10. After being blow-molded, the running board 10 can be placed through additional forming processes such as additional extrusion or material forming processes where the interior vertical walls 40 can be installed, formed, or otherwise included within the tubular structure 26 of the running board 10. The use of the term "extrusion" is meant to encompass injection molding processes as well as extrusion-type processes.

Referring again to FIGS. 3-6, this embodiment of the running board 10 using a blow molding operation provides for the simultaneous extrusion of the carbon-fiber component 20, the glass component 24 and the polymer outer covering 28 into the extruded parison 62 that will then be blow-molded into the final shape or substantially final shape of the running board 10.

Figure 5:
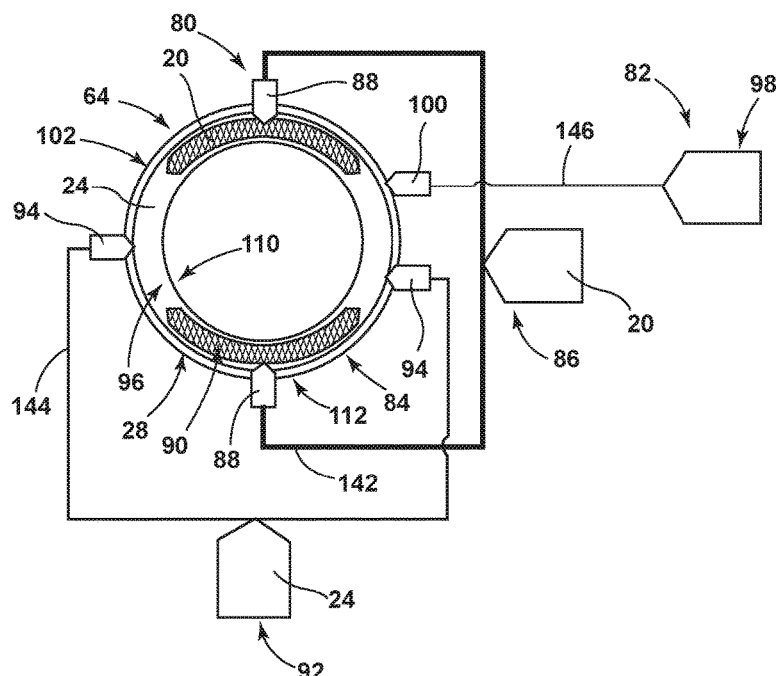
FIG. 5 is a schematic cross-sectional view of a tri-extruded core adapted to be blow-molded into an aspect of the tri-extruded multi-layer running board.
Figure 6:
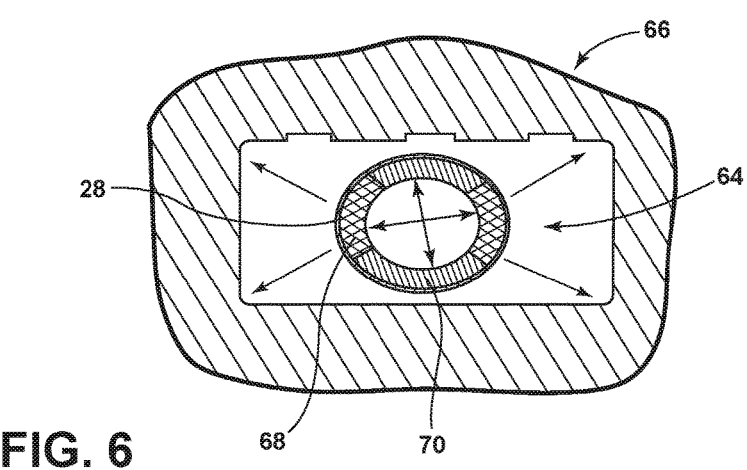
FIG. 6 is a cross-sectional view of an aspect of the tri-extruded core of FIG. 5 set within a blow mold form to be made into an aspect of the tri-extruded multi-layer running board.

Referring now to FIG. 5, the simultaneous extrusion of the three materials can be achieved through various gated structures 80 that can inject material from respective accumulators 82 and into different extrusion compartments 84 of the extrusion structure to form the extruded parison 62. A first accumulator 86 and corresponding first gated structure 88 can provide for extrusion of the carbon-fiber component 20 where the carbon-fiber component 20 is positioned in a first extrusion compartment 90 corresponding to opposing carbon-fiber portions 68 of the extruded parison 62 such that the opposing vertical walls 18 can ultimately be formed through the blow-molding process. Similarly, the glass component 24 can be extruded from a second accumulator 92 and through a second gated structure 94 and into a second extrusion compartment 96 for positioning the glass component 24 within the extruded parison 62 for ultimate blow-molding into the shape of the opposing horizontal walls 22. The outer polymer coating can be injected from a third accumulator 98, through a third gated structure 100 and into a third extrusion compartment 102 around both the carbon-fiber component 20 and the glass component 24 to simultaneously form each of the three components into the extruded parison 62 that can then be placed in the blow mold 66 for further forming into the shape of the running board 10. Stated another way, the extrusion of the carbon-fiber component 20 and glass component 24 for the extruded parison 62 can be described as a bi-extrusion process whereby the two materials are extruded simultaneously and within a single first layer 110 where the carbon-fiber component 20 and the glass component 24 are positioned in different portions of the single first layer 110. Simultaneously, the polymer outer covering 28 can be co-extruded to define a different second layer 112 that extends around the exterior surface 60 the carbon-fiber component 20 and the glass component 24.

The bi-extrusion and co-extrusion processes described herein occur simultaneously such that each of the three materials is tri-extruded and formed at the same time as the other two materials. This process of tri-extruding each of the three components at the same time makes the process of forming the running board 10 more efficient where multiple extruding processes are not necessary to form the running board 10.

According to the various embodiments, the use of the polymer outer covering 28 is adapted to provide a protective outer cover and also conceal any occurrence of bleeding of material between the carbon-fiber component 20 and the glass component 24. Through the extrusion process and the subsequent blow-molding process, it is possible that portions of the carbon-fiber component 20 may extend into at least a portion of the opposing horizontal walls 22 and a portion of the glass component 24 may extend into a portion of the opposing vertical walls 18. The use of the polymer outer covering 28 can serve to conceal these inaccuracies, blemishes, and other issues present between the formation of the inner first layer 110 of the carbon-fiber component 20 and the glass component 24.

According to the various embodiments, the polymer outer covering 28 can be made from various materials that can include, but are not limited to, unfilled polypropylene, talc-filled polypropylene, TPO, combinations thereof, or other suitable polymer material that is capable of bonding to the carbon-fiber component 20 and glass component 24 for providing an aesthetic and consistent outer surface 120 that may withstand or substantially withstand aging and other damage from ultraviolet radiation. Additionally, the polymer outer covering 28 can be easily colored or made to include various finishes typically seen in vehicles 12. Such finishes can include, but are not limited to, chrome, metallic, various colors, textured finishes for step pads 172, combinations thereof and other finished materials that can be formed into various colors, finishes, and/or textures of the outer surface 120 of the running board 10.

Figure 7:
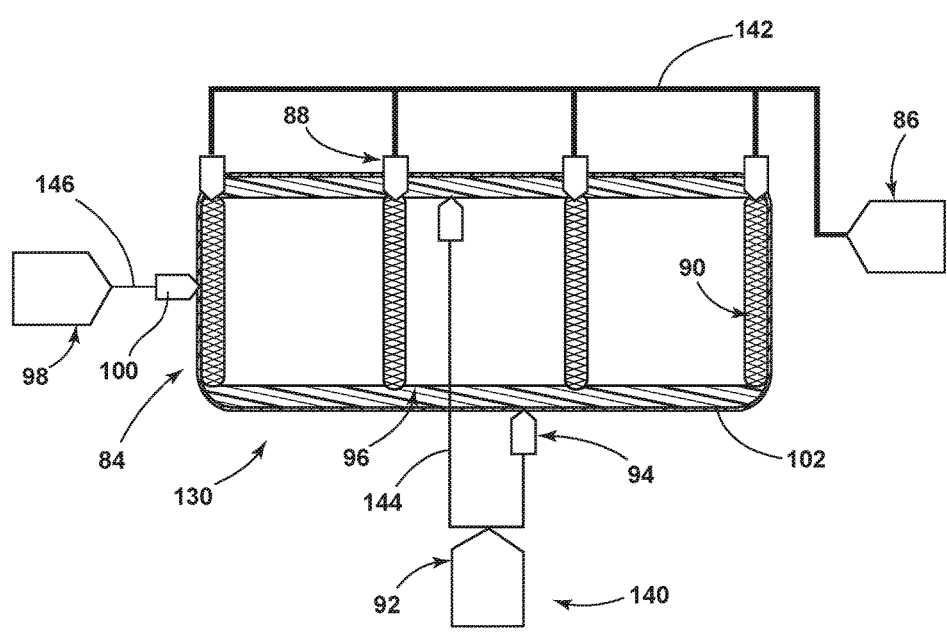
FIG. 7 is a cross-sectional view of a tri-extrusion form for molding an aspect of the tri-extruded multi-layer running board.

Referring now to FIGS. 3, 4 and 7, it is contemplated that the running board 10 can be formed as part of a tri-extrusion process where the carbon-fiber component 20, the glass component 24 and the polymer outer coating are simultaneously extruded into a tri-extrusion form 130 that defines a final cross section shape of the running board 10, and potentially a final overall shape of the entire running board 10. In such an embodiment, subsequent blow molding processes are not necessary to define the cross-sectional shape of the running board 10. In this tri-molding process, an extrusion form can include various gated structures 80 for engaging the carbon-fiber component 20, the glass component 24 and the polymer outer covering 28 into the tri-extrusion form 130. The tri-extrusion form 130 can include three sets of compartments that define the final positions for the opposing vertical walls 18, the final positions for the opposing horizontal walls 22, as well as the final positions for the interior vertical walls 40 and the polymer outer covering 28. The tri-extrusion form 130 can also be used to immediately and simultaneously form various internal structures that may not be accessible or formable using the blow-molding techniques described above. Accordingly, internal structures that are disposed within an internal cavity defined between the opposing vertical walls 18 and opposing horizontal walls 22 can be extruded during the tri-molding process.

As discussed above, the interior vertical walls 40 can include one or both of the carbon-fiber component 20 and the glass component 24, depending upon the structural needs of the particular running board 10. During the tri-molding process, molding material comprising the carbon-fiber component 20, the glass component 24, and the material for the polymer outer covering 28 is injected from three respective extruders 140, each made up of an accumulator 82 and a corresponding gated structure 80. A first material stream 142 for the material including the carbon-fiber component 20 is injected from a first accumulator 86 through the first gated structures 88 and into a first extrusion compartment 90 of the tri-extrusion form 130 to form at least the opposing vertical walls 18 and, where necessary, at least one interior vertical wall 40. A second material stream 144 including the material comprising the glass component 24 is fed from a second accumulator 92 through second gated structures 94 and into the second extrusion compartment 96 to define at least the opposing vertical walls 18, and, as discussed above, potentially at least one of the interior vertical walls 40, where necessary. In this manner, the second accumulator 92 is used to inject molten plastic having the glass component 24 into a runner and gate system to fill compartments representing the opposing horizontal walls 22. The first accumulator 86 injects the molten plastic including the carbon-fiber material into a runner and gate system defining the first gated structure 88 to fill the components that represent the opposing vertical walls 18. The third accumulator 98 injects the polymer material representing the polymer outer coating through a third material stream 146 to fill the third extrusion compartment 102 defined by an outer skin compartment to form the decorative outer surface 120 of the running board 10. The first, second and third accumulators 86, 92 and 98 are simultaneously operated to inject the respective materials through respective first, second and third material streams 142, 144, 146 through first, second and third gated structures 88, 94 and 100 and into the first, second and third extrusion compartments 90, 96, 102 of the tri-extrusion form 130 to simultaneously extrude the running board 10.

Figure 8:
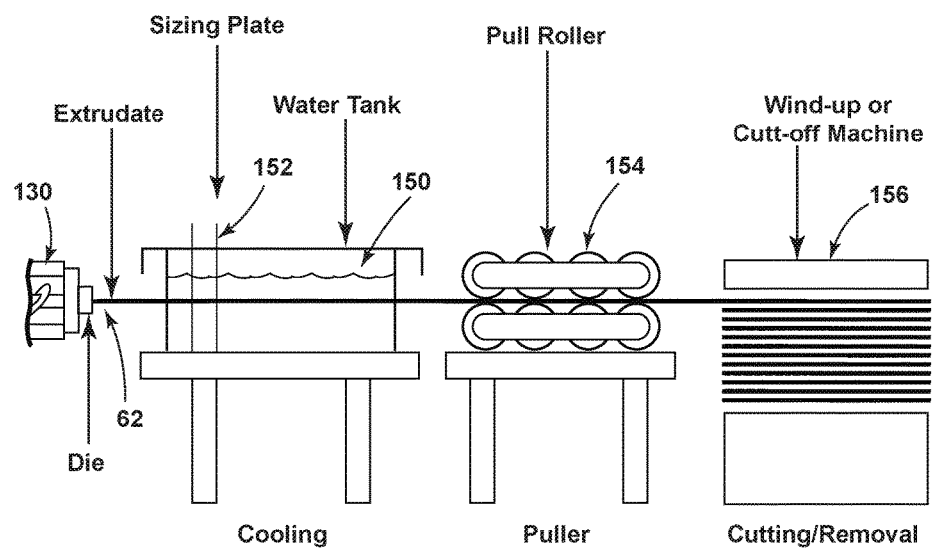
FIG. 8 is a schematic elevational view of a finishing assembly for manipulating the tri-extruded aspect of the tri-extruded multi-layer running board into a finished product for installation on a vehicle.
Figure 9:
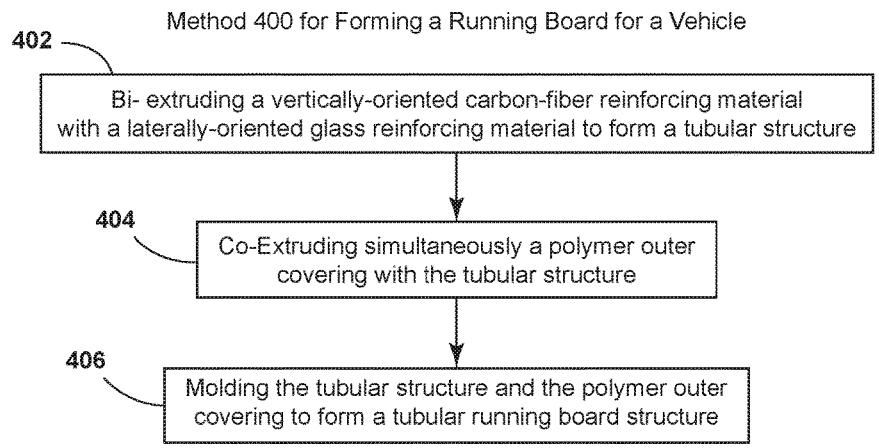
FIG. 9 is a schematic flow diagram illustrating a method for forming a tri-extruded multi-layer running board.
Figure 10:
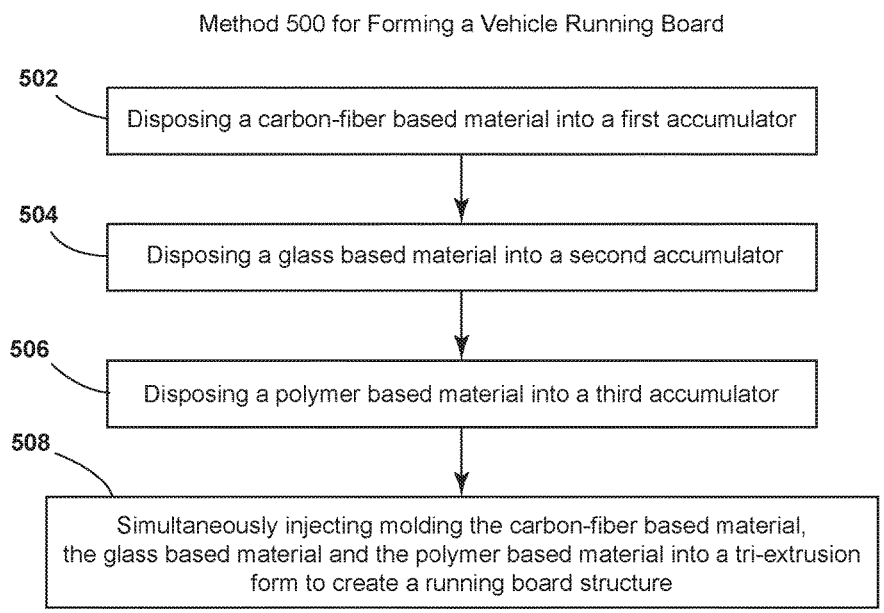
FIG. 10 is a schematic flow diagram illustrating a method for forming a tri-extruded multi-layer running board.

Referring now to FIG. 8, after being extruded within the tri-extrusion form 130, the extruded parison 62 can be passed through a cooling bath 150 to cool the once molten materials that were injected into the tri-extrusion form 130. A series of sizing plates 152 can be disposed within the cooling bath 150 to maintain the shape of the extruded parison 62 during the cooling process such that cooling does not result in deformation of the extruded parison 62 comprising the carbon-fiber component 20, glass component 24 and the polymer outer coating. It is contemplated that these materials may have different cooling rates, such that deformation may be possible during the cooling process as one material may cool faster or slower than another. The extruded parison 62 then passes through a series of rollers 154 into a cutoff machine 156 for a final forming of the running board 10. The rollers 154 and cutoff machine 156 may be used to form the end pieces 158 of the extruded parison 62 to form the final shape of the running board 10. It is contemplated that the various finish applications can be made during the extrusion process or can be made subsequent to the extrusion process such that various finishes, such as a chrome finish or other applique may be applied during subsequent manufacturing processes of the running board 10.

According to the various embodiments, these subsequent finishing processes of the running board 10 can include, but are not limited to, texturing, painting, metallic plating, applying structural brackets 170, applying step pads 172, applying treads, applying end pieces 158, applying decorative accents, combinations thereof, and other similar final assembly processes.

Referring now to FIGS. 3, 5, 6 and 9, having described various aspects of the running board 10 having the carbon-fiber component 20, the glass component 24 and the polymer outer covering 28, a method 400 is disclosed for forming a running board 10 for a vehicle 12. According to the method 400, a carbon-fiber reinforcing material having the carbon-fiber component 20 is bi-extruded in a vertically-oriented configuration with a laterally-oriented glass reinforcing material including the glass component 24 to form an extruded tubular parison 62 (step 402). Simultaneously, a polymer material is co-extruded with the tubular parison 62 to form the polymer outer covering 28 (step 404). The tubular parison 62 having the polymer outer covering 28 is then molded to form the tubular structure 26 of the running board 10 (step 406).

According to the various embodiments, the molding step 406 can be accomplished either through a tri-extrusion process where the bi-extruded vertically-oriented carbon-fiber reinforcing material having the carbon-fiber component 20 and the lateral-oriented glass reinforcing material having the glass component 24 is co-extruding with the polymer outer covering 28. This bi-extrusion and co-extrusion can occur simultaneously through a tri-extrusion form 130, substantially as described above. It is also contemplated that the molding of the tubular parison 62 having a polymer outer covering 28 can be formed through a first extrusion to form a circular tubular structure 26 and then subsequently blow-molding the circular tubular parison 62 into substantially the final shape of the running board 10. In the blow-molding process described above, an extended base tube 64 can be made of the tubular parison 62 having a polymer outer covering 28 and the base tube 64 can be blow-molded to form the final structure of the running board 10.

Referring now to FIGS. 3-4, 8 and 10, a method 500 is described for forming a vehicle running board 10. According to method 500, a material having a glass component 24 can be disposed within a first accumulator 86 (step 502). A second material having the carbon-fiber component 20 can be disposed within the second accumulator 92 (step 504). A third material having a polymer component and for ultimately forming the polymer outer covering 28 can be disposed within a third accumulator 98 (step 406). The first, second and third accumulators 86, 92, 98 can then inject the respective materials into a tri-extrusion form 130 (step 508). The tri-extrusion form 130 can include a first cavity in the form of the first extrusion compartment 90 that represents the opposing vertical walls 18 into which the material having the carbon-fiber component 20 is injected. The tri-extrusion form 130 can include a second cavity in the form of the second extrusion compartment 96 that represents the opposing horizontal walls 22 into which the material having the glass component 24 is injected. The tri-extrusion form 130 can include an outer skin cavity in the form of the third extrusion compartment 102 into which the material that ultimately forms the polymer outer covering 28 is injected. These three materials are injected simultaneously to form the tubular structure 26 of the running board 10 without subsequent blow-molding or other similar processes.

According to the various embodiments, it is contemplated that the opposing vertical walls 18 of the running board 10 extend along the length of the tubular structure 26 for the running board 10 and include a carbon-fiber component 20 that is free of the glass component 24. Similarly, the opposing horizontal walls 22 of the tubular structure 26 for forming the running board 10 can include the glass component 24, where the glass component 24 is free of the carbon-fiber component 20. Accordingly, during the various extrusion processes, the material having the carbon-fiber component 20 is fused with the material having the glass component 24 such that these materials do not substantially mingle with one another to form the extruded parison 62 that results in the shape of the running board 10. The polymer outer covering 28 then extends over the opposing vertical and opposing horizontal walls 22 to form the running board 10. In this manner, the material having the carbon-fiber component 20, the material having the glass component 24 and the material forming the polymer outer covering 28 can be extruded simultaneously and in a single extrusion to form substantially the final shape, or the final shape, of the running board 10 for the vehicle 12. As discussed above, this configuration of the running board 10 includes approximately 20%-30% of the running board 10 implementing a lighter and stronger carbon-fiber reinforced material, which may be more expensive than the material including the glass component 24. This structure reduces the overall weight of the running board 10 through the selective use of the carbon-fiber component 20 where needed. In the embodiments illustrated, the use of the carbon-fiber component 20 in the opposing vertical walls 18 increase the strength and rigidity of the running board 10 to receive vertical forces where one or more occupants may step on the top surface of the running board 10 for entering and exiting the vehicle 12. Additionally, the use of polymer outer coating provides a surface to which a chrome or painted finish can be applied and adequately received to provide a durable finish for the outer surface 120.

According to the various embodiments, the running board 10 described herein can be made into various shapes that can include, but are not limited to, circular, rectilinear, irregular, arcuate, combinations thereof, and other similar shapes depending upon the needs and desires of the user, as well as the design of the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for forming a vehicle running board, the method comprising steps of:
   simultaneously injection molding a carbon-fiber based material and a glass based material from respective first and second accumulators into a tri-extrusion form to create a tubular parison; and
   injection molding a polymer based material from a third accumulator around the tubular parison to form a tubular running board structure, wherein the tri-extrusion form is coupled with the third accumulator and the polymer based material is simultaneously injected with the carbon-fiber based material and the glass based material as part of a tri-extrusion process to form the tubular running board structure.

2. The method of claim 1, wherein the carbon-fiber based material is extruded to form at least one vertical wall of the tubular running board structure.

3. The method of claim 2, further comprising an interior wall that includes one of the carbon-fiber based material and the glass based material.

4. The method of claim 3, wherein the interior wall is parallel with a portion of the tubular parison.

5. The method of claim 3, wherein the glass based material is extruded to form at least one horizontal wall that defines an upper portion of the tubular running board structure.

6. The method of claim 5, wherein a lower horizontal wall of the at least one horizontal wall includes a contoured reinforcing structure.

7. The method of claim 6, wherein the interior wall defines at least a portion of the contoured reinforcing structure.

* * * * *